Figure 1:
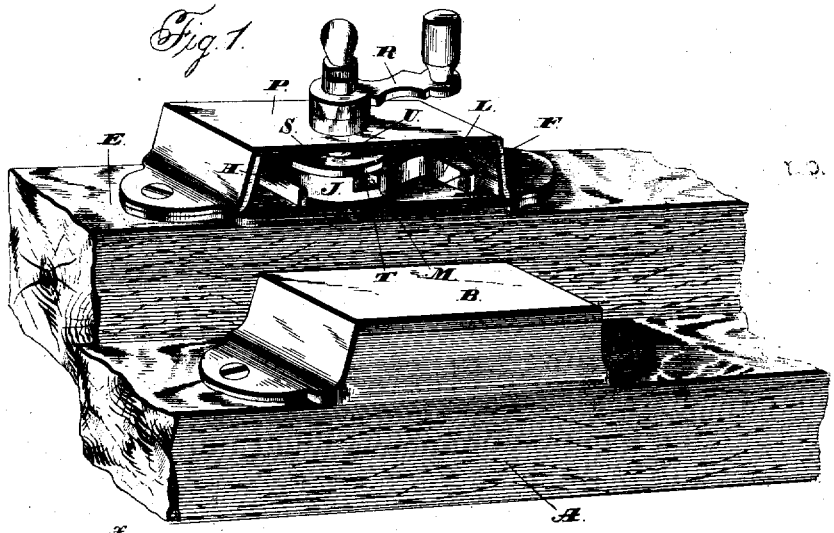

BEST AVAILABLE COPY

BEST AVAILABLE COPY

T. S. SMITH.

Assignor, by direct and mesne assignments, to H. B. IVES AND F. F. ANDREWS

FASTENER FOR THE MEETING RAILS OF SASHES.

No. 10,950. Reissued July 31, 1888.

Witnesses:
Jas. E. Hutchinson.
Chas. J. Williamson.

Inventor.
Thomas S. Smith
by Pindle and Russell
his attorneys

THE NORRIS PETERS CO., PHOTO-LITHO., WASHINGTON, D. C.

UNITED STATES PATENT OFFICE.

THOMAS S. SMITH, OF WASHINGTON, DISTRICT OF COLUMBIA, ASSIGNOR, BY DIRECT AND MESNE ASSIGNMENTS, TO H. B. IVES AND F. F. ANDREWS, BOTH OF NEW HAVEN, CONNECTICUT.

FASTENER FOR THE MEETING-RAILS OF SASHES.

SPE ICATION forming part of Reissued Letters Patent No. 10,950, dated July 31, 1888.

Original No 286,859, dated October 16, 1883. Application for reissue filed February 6, 1888. Serial No. 263,168.

*To all whom it may concern:*

Be it known that I, THOMAS S. SMITH, formerly of New Haven, Connecticut, now residing at Washington city, District of Columbia, have invented certain new and useful Improvements in Fasteners for the Meeting-Rails of Sashes, for which Letters Patent No. 286,859 were issued to me upon the 16th day of October, 1883, which Letters Patent have been found to be inoperative and invalid, in that they do not cover the invention set forth in the specification, and shown in the drawings which were filed by me in the Patent Office upon the 18th day of January, 1883, preparatory to the obtaining of the said Letters Patent. Now, therefore, being desirous of reissuing the said Letters Patent, I have prepared and do hereby declare the following to be a full, clear, and exact description of the said improvements, reference being had to the accompanying drawings, in which—

Figure 2:
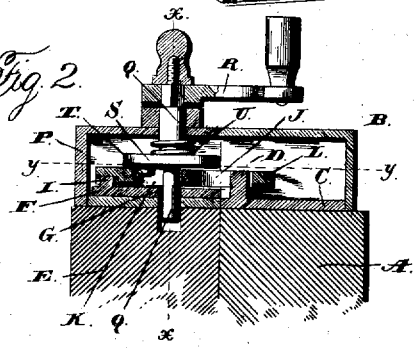
Figure 4:
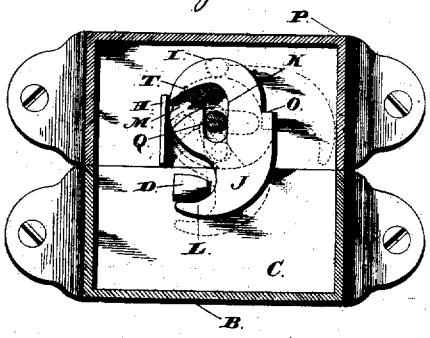
Figure 3:
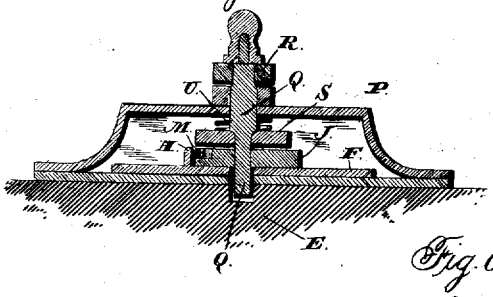
Figure 5:
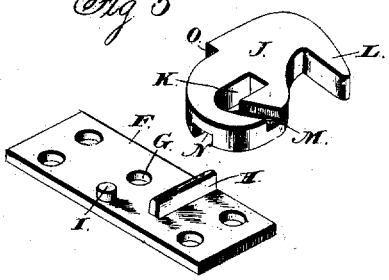
Figure 6:
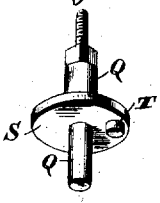

Figure 1 shows a perspective view of my improved sash-fastener in position for operation, one sash-rail being dropped a little to show the operative parts of the fastener more clearly; Fig. 2, a vertical sectional view of the same; Fig. 3, a vertical sectional view on line *x x* of Fig. 2. Fig. 4 is a horizontal sectional view on line *y y* of Fig. 2; Fig. 5, a detail view in perspective of the latch or bolt and the plate upon which it moves, and Fig. 6 a detail view of the shaft and operating-disk.

Letters of like name and kind refer to like parts in each of the figures.

This invention relates to sash-fasteners; and it has for its object to provide a device by means of which sashes may be securely locked together and secured in such manner as to prevent rattling, as will be hereinafter fully described, and particularly pointed out in the claims.

In the accompanying drawings, A designates the meeting-rail of the lower sash, to which is secured a box or casing, B, the bottom plate, C, of which is provided with an upwardly-projecting stud, D. The casing B may be of any suitable construction, and it may be integral with or separate from the bottom plate, as may be desired.

E represents the meeting-rail of the upper sash, to which is secured a plate, F, provided with a perforation, G, adjoining which is formed a vertical flange, H, and in rear of which is placed a stud, I.

J represents the latch-bolt, which consists of a body having a longitudinal slot, K, and provided at its outer end with a laterally-projecting hook, L. The upper side of the body of the latch-bolt has a notch, M, extending from the rear end of the slot K outwardly and forwardly to the edge of the bolt, and the under side of the said bolt has a notch, N, extending from the rear end of the slot K rearwardly to the edge. The side of the latch-bolt has a shoulder, O.

P represents a casing secured over the plate F, or formed integrally therewith, and having a bearing for one end of a shaft, Q, the other end of which is journaled in the perforation G in the plate F. Said shaft is provided at its upper end with a crank, R, by which it may be conveniently turned, and it carries, just below the top of the casing P, a disk, S, having a stud, T. The shaft Q passes through the slot K of the latch bolt, and the stud T fits in the notch M of the latter. The notch N in the under side of the latch-bolt receives the stud I upon the base-plate. A coiled spring, U, is adjusted upon the shaft Q between the top of the casing and the disk S, which is thereby held in contact with the latch-bolt.

As is shown in the drawings of this case, the rear or inner edge of the main or pivotal portion of the latch-bolt is rounded on the arc of a circle struck from the point occupied by the center or axis of the shaft Q when the latch-bolt has been moved longitudinally outward into position to clear the notch N from the stud I. The radius of such arc is the distance from the axis of shaft Q to the nearest side of stud I, so that when the latch-bolt J is in such position that the notch N is disengaged from the stud said latch-bolt is free to be swung about shaft Q as a center.

The inner or engaging face of flange H is situated at the same distance from the center or axis of shaft Q as the side of stud I nearest such shaft. The flange is then in position to engage the curved or rounded edge of the latch-bolt as the latter is swung around the shaft Q as a center.

The notch M is, as shown, an elongated one, really forming a groove or way in which the stud T plays and along which it moves as the latch-bolt is moved longitudinally inward and outward, as hereinafter described.

The operation of my invention will be readily understood from the foregoing description, taken in connection with the drawings hereto annexed.

With the parts in position as shown in Fig. 1, if the disk S be rotated by swinging the crank in the direction of the desired swing of the latch-bolt, the stud T on the disk S, engaging the notch M in the latch-bolt, would tend to force such bolt longitudinally over in the direction of the flange H. The engagement of this flange with the rounded surface or edge on the latch-bolt prevents such longitudinal movement and compels the latch-bolt, under the pressure of the stud T on the side of notch M, to swing around the shaft S as a center. When the latch-bolt has thus been swung out one-quarter of a turn to bring its outer hooked end into position for engagement with the keeper or stud D, the notch N is brought around opposite the stud I. The longitudinal movement of the latch-bolt, under the influence of the stud T engaging the notch M, is not now prevented by the flange H, as such movement will be an inward one in a direction substantially parallel to the flange. This movement of the latch-bolt draws the sashes together, so as to prevent rattling, and also brings the notch N and stud I well into engagement, so as to lock the latch-bolt from swinging. The stud T, as the latch is moved longitudinally inward, moves in along the notch M, thus camming and wedging the latch-bolt back, so as to draw the sashes most strongly together and hold them securely. While the latch-bolt is being swung about shaft Q as the a center, and before the notch N is brought around opposite the stud I, such stud engages the rounded edge of the latch-bolt, and effectually prevents any inward movement of such bolt until the latter has entirely completed its quarter swing and the notch N is brought around to the stud. Upon turning the crank R, shaft Q, and disk S in the opposite direction to unlock the sashes, the stud T, pressing against the outer side of the notch M, cams the latch-bolt longitudinally outward until the locking-notch N is disengaged from the stud I. During this movement of the latch-bolt the stud T travels out along the notch M. Upon the clearance of the notch N from the stud I, the stud T, now engaging the notch M at or near its outer end, swings the latch bolt back about the shaft Q as a center until the shoulder O on the bolt strikes the stud I.

My sash-fastener, as shown and described, is simple, inexpensive, neat, and is easily operated. A simple swing of the crank R swings the hooked latch out into position to engage the keeper or stud on the sash-rail, then draws the bolt in, so as to force the sash-rails closely together, and locks it securely against movement until the crank is swung in the opposite direction.

Having thus described my invention, what I claim is—

1. In a fastener for the meeting-rails of sashes, the combination, with a suitable casing, of the shaft Q, having disk S, provided with stud T, the latch-bolt having hook L, and provided with a slot, K, by which it is mounted upon shaft Q, a notch engaging the stud T, and a rounded guiding-surface to guide it in its swing about the shaft Q, and the stationary flange for engaging such guiding-surface, substantially as and for the purpose set forth.

2. In a fastener for the meeting-rails of sashes, the combination of the base-plate having a flange, the pivot-shaft, suitable casing or means for bearings and support of such shaft, the disk thereon provided with an eccentrically-arranged stud, the latch-bolt provided with the longitudinal slot through which the shaft passes, the notch M, engaged by the stud on the disk, and the rounded guiding-edge for engaging the flange on the base, substantially as and for the purpose described.

3. In a fastener for the meeting-rails of sashes, in combination with a suitable support or casing, the rotary shaft, the disk thereon provided with an eccentric-stud, the hooked latch-bolt provided with a longitudinal slot through which the shaft passes, and a notch, M, engaged by the disk stud, and engaging guiding surfaces on the latch-bolt and base to prevent the latch-bolt being drawn inward until it has been swung outward, substantially as and for the purpose described.

4. In a fastener for the meeting-rails of sashes, in combination with a suitable support, the pivot-shaft, the disk thereon provided with an eccentric-stud, the hooked latch bolt provided with the rounded guiding-surface, the longitudinal slot, the notch M, and the locking-notch, the flange H, and the stud I, substantially as and for the purpose described.

5. In a fastener for the meeting-rails of sashes, the combination of the base-plate having a perforation, a stud, and a flange relatively disposed, as described, the latch-bolt having a longitudinal slot, a hook, and notches in its upper and under sides, as set forth, and provided with a shoulder on one side, the shaft having an operating-disk provided with a stud on its under side and a suitable casing, all constructed to operate in connection with a stud upon the meeting-rail of the lower sash, substantially as set forth.

In testimony whereof I hereunto set my hand this 25th day of January, A. D. 1888.

THOMAS S. SMITH.

Witnesses:
JOSEPH W. DAVIS,
PHILIP G. RUSSELL.